United States Patent
Bolin

(10) Patent No.: US 8,851,067 B2
(45) Date of Patent: Oct. 7, 2014

(54) THERMAL SOLAR PANEL WITH INTEGRATED CHEMICAL HEAT PUMP

(75) Inventor: Goran Bolin, Taby (SE)

(73) Assignee: Climatewell AB, Hagersten (SE)

(*) Notice: Subject to any disclaimer, the term of this patent is extended or adjusted under 35 U.S.C. 154(b) by 351 days.

(21) Appl. No.: 13/319,496

(22) PCT Filed: Dec. 8, 2010

(86) PCT No.: PCT/SE2010/051353
§ 371 (c)(1),
(2), (4) Date: Jan. 9, 2012

(87) PCT Pub. No.: WO2011/071448
PCT Pub. Date: Jun. 16, 2011

(65) Prior Publication Data
US 2012/0111319 A1    May 10, 2012

(30) Foreign Application Priority Data
Dec. 9, 2009  (SE) .................................. 0950949

(51) Int. Cl.
*F24J 2/32*  (2006.01)
*F24J 2/07*  (2006.01)
*F24J 2/10*  (2006.01)
*F24J 2/05*  (2006.01)
*F24J 2/46*  (2006.01)
*F28D 20/00*  (2006.01)

(52) U.S. Cl.
CPC ............... *F24J 2/07* (2013.01); *F28D 20/003* (2013.01); *F24J 2/1047* (2013.01); *F24J 2/055* (2013.01); *Y02E 10/41* (2013.01); *F24J 2/32* (2013.01); *Y02B 10/24* (2013.01); *F24J 2/4649* (2013.01); *Y02E 10/44* (2013.01)
USPC ........... 126/635; 126/636; 126/637; 126/652; 165/104.11

(58) Field of Classification Search
CPC .......... F24J 2/05; F24J 2/055; F24J 2/32; F24J 2002/5275; F24D 15/02; F24D 15/0266; F24D 15/0275; F24D 15/04; Y02E 10/44
USPC ........................................... 126/635–637, 652
See application file for complete search history.

(56) References Cited

U.S. PATENT DOCUMENTS 2,119,091 A * 5/1938 Atkinson et al. ............ 196/119
4,160,444 A * 7/1979 Hamilton ..................... 126/636
(Continued)

FOREIGN PATENT DOCUMENTS

| FR | 2307232 A | * 12/1976 |
| FR | 2501347 A1 | 9/1982 |
| WO | 86/00691 A1 | 1/1986 |

OTHER PUBLICATIONS

International Search Report and Written Opinion dated Oct. 5, 2011 for Int. Appl. No. PCT/SE2010/051353, 9 pp.

*Primary Examiner* — Jorge Pereiro
(74) *Attorney, Agent, or Firm* — Perkins Coie LLP

(57) ABSTRACT

A solar panel comprises a conduit which in the usual way is designed to comprise a heat carrying medium for heat transfer between the solar panel and the surrounding environment. The conduit is placed so that it can be heated by the rays from the sun. The solar panel comprises a chemical heat pump of the type hermetically sealed unity tube with a reactor part, an evaporator/condenser part and a passage there between. The part of the unity tube comprising the reactor part of the chemical heat pump is positioned in heat conducting contact with the first conduit and thereby the part of the unity tube with the reactor part will be heated. The unity tube may be surrounded by a heat insulating part of vacuum jug type comprising an evacuated space between an outer wall and an inner wall. The inner wall may at its outwards facing surface comprise a radiation receiving part adapted to transform solar radiation to heat and which is in heat conducting contact with the first area and the first conduit.

18 Claims, 5 Drawing Sheets

(56) References Cited

U.S. PATENT DOCUMENTS

| | | | |
|---|---|---|---|
| 4,184,477 A * | 1/1980 | Yuan | 126/620 |
| 4,187,688 A | 2/1980 | Berg | |
| 4,257,402 A * | 3/1981 | Westerman, II | 126/652 |
| 4,259,946 A * | 4/1981 | Roehm | 126/652 |
| 4,320,246 A * | 3/1982 | Russell | 136/248 |
| 4,335,709 A * | 6/1982 | Slaats | 126/635 |
| 4,440,156 A * | 4/1984 | Takeuchi et al. | 126/652 |
| 4,448,242 A * | 5/1984 | Andres et al. | 165/104.14 |
| 4,565,243 A * | 1/1986 | Ernst et al. | 165/104.26 |
| 4,688,399 A * | 8/1987 | Reimann | 62/485 |
| 4,909,316 A * | 3/1990 | Kamei et al. | 165/104.26 |
| 5,027,891 A * | 7/1991 | Fulford et al. | 165/104.14 |
| 5,850,741 A * | 12/1998 | Feher | 62/3.61 |
| 5,924,479 A * | 7/1999 | Egbert | 165/104.14 |
| 6,672,373 B2 * | 1/2004 | Smyrnov | 165/104.26 |
| 7,832,204 B2 * | 11/2010 | Bidner et al. | 60/320 |
| 8,191,549 B2 * | 6/2012 | Schedletzky | 126/704 |
| 2003/0221438 A1 * | 12/2003 | Rane et al. | 62/271 |
| 2008/0156314 A1 * | 7/2008 | Heuer et al. | 126/650 |
| 2009/0293866 A1 * | 12/2009 | Horne et al. | 126/655 |

\* cited by examiner 35  37  34  31  33

35
38
31

35
31
39
40

THERMAL SOLAR PANEL WITH INTEGRATED CHEMICAL HEAT PUMP

TECHNICAL FIELD

The present invention concerns a solar panel with extended functionality.

BACKGROUND

Chemical heat pumps with integrated solar panels are disclosed in the published international patent application WO 2009/070090. In such chemical heat pumps unit tubes can be used, of which the basic construction also is disclosed in the published international patent application WO 2007/139476. Unity tubes are also used in the system which is disclosed in the published international patent application WO 2009/154537.

The principle for the chemical heat pump is well known, see for instance U.S. Pat. Nos. 5,440,889, 5,056,591, 4,993,239, 4,754,805 and the published international patent applications WO 94/21973, WO 00/31206, WO 00/37864 and WO 2005/054757. In a chemical heat pump there is an active substance, which performs process in the heat pump and which works together with a volatile medium, the absorbent, which is a dipolar liquid, in most cases water.

A chemical heat pump can as mentioned above comprise a unit tube. In such an embodiment the reactor part and evaporator-/condenser part of the heat pump are in the same completely sealed tube. Cooling and heating of such a heat pump is conducted by different parts of the walls and thereby through different wall parts of the sealed tube. Such a unit tube does not contain any moving parts and especially not any from the outside controllable valve and can be said to be an entirely passive device.

Solar panels in which solar energy is used for heating of a heat carrying medium, for instance water, are subject to huge stress, such as large and fast temperature variations, varying humidity and mechanical stress. It is of course of major economical interest to be able to design solar panels with high efficiency and high general usefulness for various applications. Solar panels in their simplest form comprise tubes for a heat carrying medium such as water, which tubes are placed so that they have parts which are heated by irradiation from the sun and thereby also the amount of heat carrying medium in those parts. The heated heat carrying medium is transported to places where it can be utilized, for instance for heating of a building or for use as hot tap water, or stored for later use.

In a chemical heat pump according to the above described published international patent application WO 2009/070090 with an integrated thermal solar panel, a part of the chemical heat pump is a thermal solar panel. An imperfection for such a thermal solar panel is that both the chemical heat pump and the thermal solar panel become a reduced field of use.

In the published U.S. Pat. No. 4,187,688 there is disclosed a chemical heat pump driven by solar energy. The heat pump comprises a number of connected units 100 placed next to each other, which each is made up of a tube. These tubes are themselves chemical heat pumps and comprise at one end a reactor part 102 and at the opposite end an evaporator/condenser part 104, se FIGS. 13 and 14. Exchange of heat between the reactor part for each tube unit and a transversal tube 116 is carried out by a heat exchange loop 123. In the tube units 100 there are thus passages into the tubes for the heat exchange loop and also passages for electrical wires. Moreover there is an electrically controlled valve 10 in each tube unit.

SUMMARY OF INVENTION

It is an object of the present invention to at least partially obviate at least some of the disadvantages in the prior art and to provide a thermal solar panel for efficient use of solar energy.

In a first aspect there is provided a solar panel comprising a first tube 17, adapted to contain a heat carrying medium for heat exchange between the solar panel and a surrounding, whereby the solar panel comprises a chemical heat pump 3 comprising an active substance and a volatile liquid with the ability to be absorbed by the substance at a first temperature and be desorbed by the substance at a second higher temperature and the chemical heat pump comprises:

a first part 3a, which has a longitudinal direction and comprises a reactor part, which comprises the active substance and is adapted to be heated and cooled by an external medium, whereby the first part is positioned to be heated by sunlight, when solar radiation hits the solar panel for charging of the chemical heat pump, an evaporator/condenser part, comprising volatile liquid in condensed form and is adapted to be heated and cooled by an external medium, and a passage for the vapor phase of the volatile liquid, connecting the reactor part and the evaporator/condenser part with each other, whereby the chemical heat pump 3 is made as a hermetically sealed unit tube, and the first tube 17 over the first part 3a is placed in the longitudinal direction of the first part in heat exchanging contact with the unit tube 3 in the first part.

In a second aspect there is provided a chemical heat pump comprising an active substance and a volatile liquid, with the ability to be absorbed by the substance at a first temperature and be desorbed by the substance at a second higher temperature, whereby the active substance at the first temperature has a solid state, from which the active substance during absorbing of the volatile liquid and its gas phase immediately transforms partially to a liquid state or a solution and at the second temperature has a liquid state or exists as a solution, from which the active substance at emitting of the volatile liquid, in particular its gas phase, immediately transforms partially to solid state, comprising:

a reactor part adapted to be heated and cooled by an external medium and comprising a matrix for the active substance, so that the active substance both in solid state and in liquid state or in a solution phase is retained in and/or bound to the matrix, an evaporator/condenser part adapted to be heated and cooled by an external medium and comprising the part of the volatile liquid, which is present in condensed form, whereby the evaporator/condenser part comprises a porous material, permeable to the volatile liquid, a passage for the volatile liquid in gas phase, connecting the reactor part and the evaporator/condenser part with each other, characterized in that the reactor part is positioned in a first part of a tube and the evaporator/condenser part in a second part of a tube, whereby the matrix and the permeable material are placed as strips at the wall in each part of the tube, so that a central through passage exists in each tube.

Further embodiments and aspects are provided in the dependent claims which are incorporated herein.

A chemical heat pump is accommodated in a thermal solar panel. The thermal solar panel and the chemical heat pump are not necessarily integrated with each other. The fields of use for such a thermal solar panel are thereby extended compared to earlier known thermal solar panels.

The chemical heat pump is designed as a closed tube of the type unity tube, which may be relatively elongated. One half of the unity tube or more general a part at a first end is or comprises the reactor part of the heat pump, also called the accumulator part and the other half of the unity tube or more general a part at a second end is or comprises the evaporator/condenser part of the heat pump. Each of the halves of the unity tube or both ends can if required be positioned in a heat insulating part each, whereby at least the heat insulating part positioned at the reactor part of the chemical heat pump is transparent to light. The heat insulating parts can for instance be of the vacuum jug type and may for instance comprise an evacuated space.

The unity tube is a completely closed device and no pipes pass through its wall, especially no channels for any fluid such as a heat carrying medium and also no electrical wires. The reactor part and the evaporator/condenser part are in the same completely closed space, which is made up of the inner of the unity tube. Cooling and heating of the reactor part and the evaporator/condenser part respectively is performed through the different wall-parts in the closed tube. The unity tube does not comprise any movable parts. The unity tube comprises in its inner space only a first space in which the reactor part is, a second space in which the evaporator/condenser part is and a third space which constitutes a channel connecting the two mentioned spaces.

The first part of the unity tube containing the reactor part and the second part of the unity tube containing the evaporator/condenser tube are also surrounded by a heat exchanger or heat transferring part each, for cooling or heating of a heat carrying medium such as water. At the first part of the unity tube a solar panel surface is optionally arranged, which is a part of a radiation-receiving part and is adapted to transform incoming radiation from the sun to heat. The solar panel surface can be arranged for instance in or on the heat insulating part of on the heat transferring part. At the second part of the unity tube, which constitutes or contains the evaporator/condenser part, there is no such solar radiation-receiving part. Because of the absence of a solar radiation-receiving surface and because of the heat insulating part surrounding the second part of the unity tube, if such a part is arranged, the heating of the second part may be smaller, especially much smaller, than the heating of the first part, so that the first part will hold a temperature which is lower than the temperature in the first part when radiation from the sun are directed at the solar panel. This applies even though the second part is positioned directly next to the first part such as at or inside the solar panel and for instance also is radiated by rays from the sun.

A more effective thermal solar panel with extended functionality, such that it may be used for cooling with energy form the sun, can thereby be realized.

Further the chemical heat pump may work according to the hybrid principle and have a particular efficient design.

Thus a chemical heat pump designed as a unity tube comprise for instance a vacuum sealed tube so that a part at a first end of the unity tube is utilized as an evaporator/condenser and a part at the second end of the unity tube is utilized as a reactor and the space between the two tube parts is utilized for vapor transport. The process in the chemical heat pump may be carried out according to the so called hybrid principle; se for instance the above mentioned published international patent applications WO 00/37864 and WO 2007/139476. The hybrid process comprises two phases, a charging phase and a discharging phase. During the charging phase a salt which is in the reactor part is dried, so that a ligand or an absorbed medium, for instance water is released from the salt and transported in gas phase over to the evaporator/condenser where it is condensed. When a majority of the previously in the salt bound ligand or absorbed medium is transferred to the evaporator/condenser, the chemical heat pump is charged. In the discharge phase the ligand is moved in the opposite direction and is again bound to the salt. The advantage of this process is that heating and cooling can be achieved as in other heat pumps.

Further a matrix may be used in the chemical heat pump for carrying and holding of the salt, the salt is generally denoted a active substance, both its solid state and its liquid state and its solution, see the published international patent application WO 2007/139476. Such a matrix is typically an inert material such as aluminum oxide and it has pores, which are permeable to the gas phase of the ligand. At the pores of the walls the active substance is bound. The matrix may be of a material that in general comprises separate particles and may be in the form of a powder of a compressed fiber material.

The chemical heat pump can in general be designed so that it easily can be integrated with or be a part of a solar panel. The chemical heat pump can also be designed so that it may be produced in a continuous process and thereby facilitate mass production and at the same time achieve low production costs.

A thermal solar panel with integrated chemical heat pump can at least in certain cases with suitable design have one or several of the following advantages:

The radiation from the sun shines at the reactor part of the chemical heat pump almost direct so that a hydraulic energy transfer in between can be completely eliminated and the thereby associated exchanges of heat. Thereby heat loss is avoided, which may otherwise be about 15-40% of all energy, which means that the thermal solar panel will achieve a higher yield of the energy from the sun. With a higher yield at each solar panel a solar panel assembly comprising solar panels of the claimed type can be reduced in size compared to a solar panel assembly comprising traditional solar panels in combination with a absorption heat pump. This reduces the cost for the solar power plant and the repayment for the end user is reduced.

A higher temperature in the reactor part of the chemical heat pump can be obtained by irradiation so that other salts may be used, which have a greater temperature difference $\Delta T$, whereby the chemical heat pump can produce useful (high exergy) heat energy from a relatively cold by free energy source or produce useful cooling from ma warm, free source, for instance air at 35° C. This means that the cost to obtain a heat sink can be lowered.

The distributing hydraulic system for the heat carrying medium can be designed simpler and at a lower cost.

Further objects and advantages of the invention are given in the description and partially be apparent from the description or can be experienced by working the invention. The purposes and advantages of the invention can be understood and be obtained by the methods, processes, organ and combinations given in the appended claims.

BRIEF DESCRIPTION OF THE DRAWINGS

While the novel features of the invention are specified particularly in the appended claims, a full understanding of the invention, both regarding organization and content and of the above given and other features be obtained and the invention be better understood by studying the following detailed description of non limiting embodiments described below with reference to the appended drawings in which:

DETAILED DESCRIPTION

Figure 1:
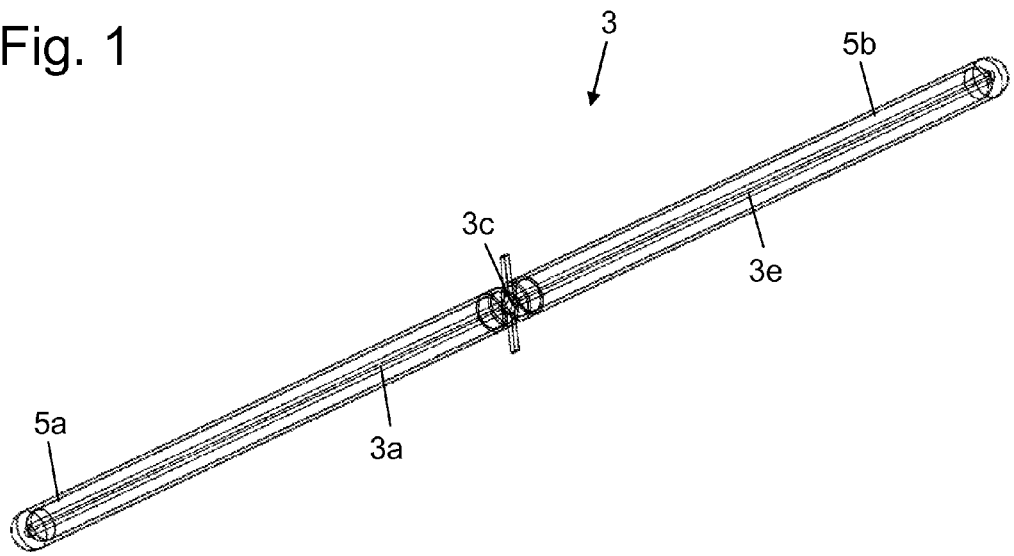
FIG. 1 shows a perspective drawing of a thermal solar panel comprising a chemical heat pump designed as a straight unit tube.

In a first aspect there is provided a solar panel comprising a first conduit 17 adapted to comprise a heat carrying medium for heat transfer between the solar panel and a surrounding environment, whereby the solar panel comprises a chemical heat pump 3 comprising an active substance and a volatile liquid, which can be absorbed by the substance at a first temperature and be desorbed by the substance at a second higher temperature, and the chemical heat pump comprises:

a first part 3a having a longitudinal direction and comprising a reactor part, which comprises the active substance and is adapted to be heated and be cooled by an external medium, whereby the first part is positioned to be heated by sunlight, when radiation from the sun shines at the solar panel for charging of the chemical heat pump, an evaporator/condenser part comprising volatile liquid in condensed form and being adapted to be heated and cooled by an external medium, and a passage for the gas phase of the volatile liquid, connecting the reactor part and the evaporator/condenser part with each other, wherein the chemical heat pump 3 is designed as a hermetically sealed unit tube and the first conduit 17 over the first part 3a extends in the longitudinal direction of the first part in heat conducting contact with the unity tube 3 in the first part.

In one embodiment there is a radiation receiving part 13a, which is designed with a surface for transformation of solar radiation to heat and which is in heat conducting contact with the first part 3a, in particular also with the first conduit 17.

In one embodiment the unity tube 3 is surrounded by a heat insulating part 5a, 5e, in particular by a heat insulating part of the vacuum jug type comprising an evacuated space. In one embodiment the heat insulating part 5a, 5e of the vacuum jug type comprising an evacuated space is positioned between an outer and an inner wall, whereby the inner wall at the first part 3a at its outwards directed surface comprises a radiation receiving part, which is or has a surface 11 adapted for transformation of solar radiation to heat and which is in heat conducting contact with the first part 3a, in particular also with the first conduit 17.

In one embodiment there is a second part 3e of the unity tube 3, which comprises the evaporator/condenser part of the chemical heat pump and is designed and/or positioned so that when radiation from the sun shines at the solar panel, the second part is heated less than the first part 3e, in particular so that the second part is heated considerably less than the first part.

In one embodiment a second part 3e of the unit tube comprising the evaporator/condenser part of the chemical heat pump, is placed in direct proximity to the first part 3a, in particular so that it is placed behind the first part 3a as seen in the direction of the rays from the sun.

In one embodiment a first heat transferring part 13a is positioned in direct heat conducting contact with the first part 3a and with the first conduit 17.

In one embodiment the first heat transferring part 13a comprises an inner part 15i in contact with the first part 3a and having the shape of a sheet or a bent panel, surrounding a part of or essentially the entire first part.

In one embodiment the first heat transferring part 13a comprises an outer part 15o surrounding essentially the entire inner part 15i.

In one embodiment the inner and outer parts 15i, 15o of the first heat transferring part 13a are connected by an intermediate part 15b positioned directly against the surface of the first conduit 17.

In one embodiment the first part 3a of the unity tube is surrounded by a heat insulating part 5a of the type vacuum jug, comprising an evacuated space situated between an outer and an inner wall and the first heat transferring part 13a is positioned against the inner wall of the heat insulating part 5a, against the first part 3a and against the first conduit 17.

In one embodiment the first heat transferring part 13a comprises an inner part 15i and an outer part 15o, whereby the outer part essentially surrounds the entire inner part and is positioned against the inner wall of the heat insulating part 5a.

In one embodiment there is a second heat transferring part 13e, positioned in direct heat conducting contact with a second part 3e of the unity tube, comprising the evaporator/condenser part of the chemical heat pump and with a second conduit designed to comprise a heat carrying medium for heat exchange between the solar panel and a surrounding environment, in particular so that the second conduit is adapted for connection to a distribution system for the heat carrying medium.

In one embodiment the second heat transferring part 13a comprises an inner part positioned against the second part 3e, whereby the inner part in particular has the shape of a sheet or a bent panel, surrounding a part of or essentially the entire second part 3e.

In one embodiment the second heat transferring part 13e comprises an outer part surrounding essentially the entire inner part.

In one embodiment the inner and outer parts of the heat transferring part 13a are connected by an intermediate part positioned directly against the surface of the second conduit.

In one embodiment there is a reflector 7 for sunlight, positioned to reflect sunlight for heating of the first part 3a.

In one embodiment the reflector 7 is a part of a reflector panel 7' comprising first parts for reflection of sunlight for a plurality of adjacent positioned first unity tubes 3 and associated first conduits 17.

In one embodiment the reflector panel 7' comprises second parts 7", positioned between the first parts 7 and are positioned for uptake of a second part 3e of second unity tubes 3, comprising evaporator/condenser parts of the chemical heat pump and which are positioned between the first unity tubes and associated first conduits 17.

In a second aspect there is provided a chemical heat pump comprising an active substance and a volatile liquid, which can be absorbed by the substance at a first temperature and be desorbed by the substance at a second higher temperature, whereby the active substance at the first temperature has a solid state, from which the active substance during uptake of the volatile liquid and its gas phase immediately transforms partially into liquid state or solution phase and at the second temperature has a liquid state or is in solution, from which the active substance during emission of the volatile liquid, in particular its gas phase, immediately partially transforms into solid state comprising:

a reactor part designed to be heated and cooled by an external medium and comprising a matrix for the active substance so that the active substance both in solid state and in liquid state or in solution is retained in and/or bound to the matrix, an evaporator/condenser designed to be heated and cooled by the external medium and comprising the part of the volatile liquid present in condensed form, whereby the evaporator/condenser part comprises a porous material permeable for the volatile liquid, a passage for the gas phase of the volatile liquid, connecting the reactor part and the evaporator/condenser part with each other, whereby the reactor part is positioned in a first part of a tube and the evaporator/condenser part in a second part of a tube, whereby the matrix and the permeable material are positioned in the form of ribbons at the wall in each part of the tube, so that there is a central through passage in each part of the tube.

In one embodiment the matrix and the permeable material are restricted or held in place by a heat conducting material at least partially provided with openings to facilitate transport of gas to and from the matrix and the permeable material respectively.

In one embodiment the matrix and the permeable material are arranged as layers placed between washers comprising a hole in the middle.

In one embodiment the matrix is arranged as a spiral, restricted by the permeable material A thermal solar panel comprising a chemical heat pump 3 of the type unit tube, see the above mentioned international patent applications WO 2007/139476 and WO 2009/070090, which unity tube is designed as a completely hermitically sealed tube, which has an axis and can be relatively elongated, i.e. having a relation between diameter and length of at least 1:10, more common at least 1:20, see FIG. 1. A first part 3a at one end of the tube, with a length corresponding for instance to about half the tube, of slightly less than the total length of the tube, constitutes or comprises the reactor part of the chemical heat pump and a second part 3e at the other end of the tube, also with a length corresponding for instance to half of or slightly less than the total length of the tube, constitutes of comprises the evaporator/condenser part of the chemical heat pump. Also chemical heat pumps with a different internal design than what is shown in the above mentioned international patent applications can of course be used as chemical heat pumps with solid or liquid active substance or absorber.

Figure 2A:
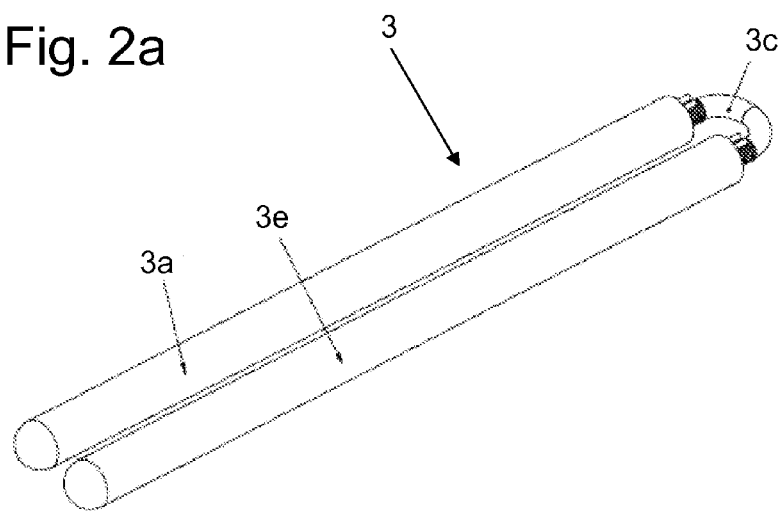
FIG. 2a shows similar to FIG. 1, but a bent unit tube.

The unit tube 3 comprises a first and a second part 3a, 3e, which are connected to each other by an intermediate part 3c. These different parts of the unity tube are tubes, which each comprise and enclose a corresponding inner volume. The inner volume of the intermediate part 3c constitutes a conduit for passage of the gas phase of a volatile liquid between the inner volumes in the first and second part 3a, 3e, i.e. between the reactor part and evaporator/condenser part of the chemical heat pump. The tube in the intermediate part 3c is in one embodiment narrower than the tubes at the ends of the unity tube 3. As shown in FIG. 1 the unity tube has in one embodiment an essentially straight design, so that its different parts 3a, 3e, 3c have the same longitudinal axis. The different parts are in one embodiment cylindrical such as circular cylindrical and then they are suitably also concentrically, i.e. share the same symmetry axis. Other embodiments are possible and for instance the first and second parts 3a, 3e may have an essentially straight design with straight longitudinal axis, whereas the intermediate part 3c is bent, see FIG. 2a. The first and second part 3a, 3e can the be parallel to each other, i.e. so that their longitudinal axis are parallel and they can for instance be next to each other or inside each other. The intermediate part 3c is thereby shaped as an U, i.e. it gives a 180° change of the direction of the flow of a fluid flowing through the intermediate part 3c.

The first and the second area 3a, 3e of the unity tube 3 may be enclosed of may be positioned in a heat insulating part 5a, 5e each, which may be a heat insulating layer, heat insulating shell or heat insulating panels. The heat insulating parts 5a, 5e prevent conduction of heat from and to the unity tube 3, i.e. it prevents heat exchange of the unity tube with the surrounding outside the heat insulated parts and they may be of a vacuum jug type and for instance comprise an evacuated space. At least the heat insulating part 5a at the part of the unity tube which comprises the reactor part, may be at least partly transparent to light, i.e. it is able to transmit light, in particular sunlight. Such a heat insulating part 5a may be a double walled glass tube, where the space between both its walls, its inner wall and its outer wall, is sealed and evacuated, i.e. comprises essentially vacuum or a gas for instance at low pressure, such as a gas at very low pressure, see FIG. 3. The heat insulating parts 5a, 5e of this embodiment may be used at both parts 3a, 3e of the unity tube 3.

Figure 5A:
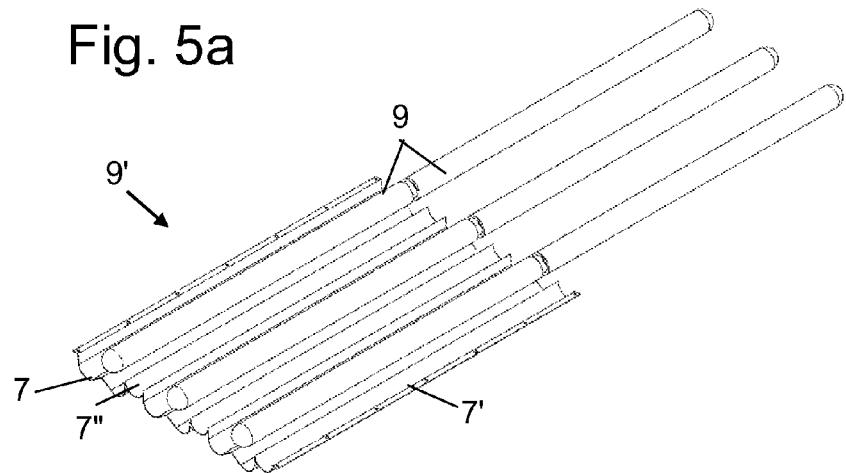
FIG. 5a shows a perspective view of several solar panels assembled to a solar panel module.

Further at the first part 3a of the unity tube 3, comprising the reactor part, a reflector 7 can be positioned, see FIG. 5a. Such a reflector 7 has a light-reflecting surface, reflecting light, which falls in one or several pre-determined directions at the first part of the unity tube and in particular at a sunlight absorbing surface in this part, se below. A unity tube 3 with associated heat insulating parts 5a, 5e and a reflector 7 may constitute a solar panel or a solar panel unit or a solar panel element 9. The reflector 7 may comprise a suitably bent metal panel 7' and the same metal panel 7' can as shown comprise bent parts, which constitute reflectors for several solar panels next to each other 9. A solar panel module 9' may comprise a number of solar panels 9, which have reflectors 7 made of the same metal panel.

Figure 5B:
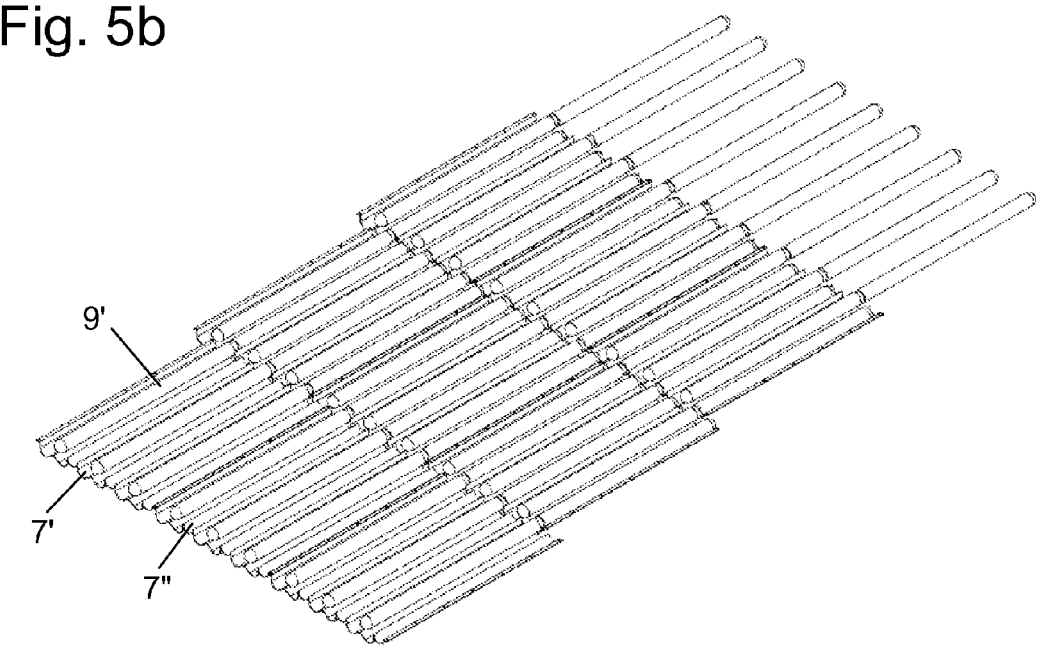
FIG. 5b shows a perspective view of several solar modules assembled to a solar panel plant.

Several solar panel modules 9' may be connected in relation to the energy need, see FIG. 5b. As shown for the case with straight unity tubes 3, the reflector panel 7' in each module 9' may have parts 7" which are suitable to hold the other parts 3e of unity tubes of another solar panel module. These parts may be designed so that they do not reflect sunlight towards the other areas. The profile of the reflector panel 7' then comprises, as seen at a passage over the cross section of panel, first for instance a part 7 adapted for reflection of sunlight towards a first part 3a of a unity tube, thereafter a part 7'' adapted for receiving the second part 3e of another unity tube, thereafter a part 7 for reflection of sulight towards the first part of a unity tube etc.

At the part 3a of the unity tube 3, which comprises the reactor part, a radiation-absorbing part may be positioned with a sunlight absorbing surface designed to transform solar energy into heat. Such a solar absorbing surface may be designed as a light absorbing layer 11 of a suitable light absorbing material. The light absorbing layer may be applied on the outer surface of a heat exchanger or a heat conducting part, see FIG. 3. Alternatively such a layer may be applied to or be a part of the heat insulating part 5a. Thus the layer may be applied at or on an inner surface of the heat insulating part 5a, such as on the inner surface directed against the axis of the inner glass wall in a double walled evacuated tube, or such a layer may also be on the outer surface of the inner glass wall directed away from the axis. The radiation absorbing part is constituted of parts of the heat transferring part, of the heat insulating part or of the inner wall of the evacuated tube.

Figure 3:
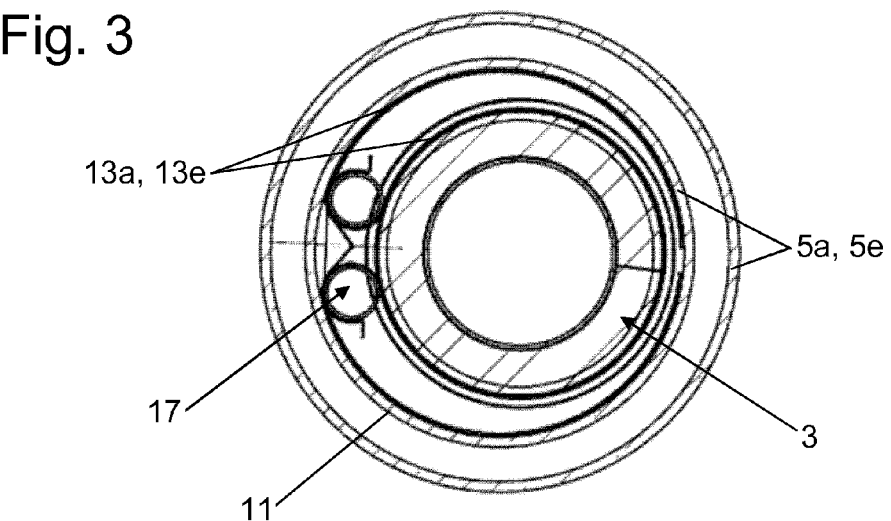
FIG. 3 shows a sectional drawing of thermal solar panel of the vacuum solar panel type comprising a chemical heat pump, designed as a unit tube, and a heat exchanger.
Figure 4:
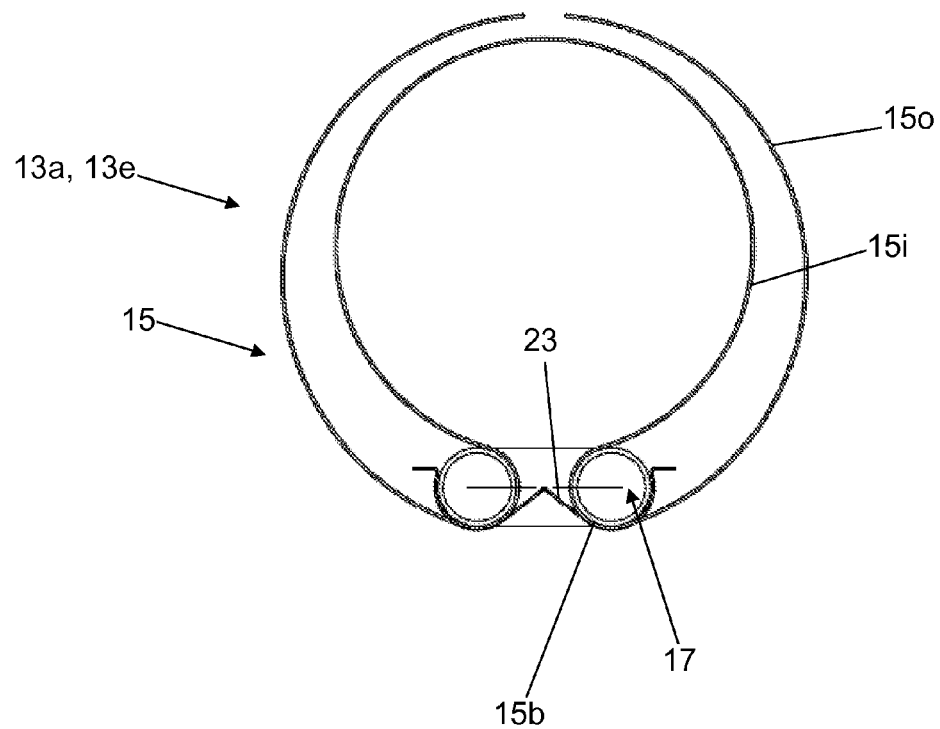
FIG. 4 shows a sectional drawing of the heat exchanger in FIG. 3.

The heat produced by the sunlight absorbing surface can if desired be transferred to the reactor part of the unity tube 3 by a heat transferring part 13a, here also called heat exchanger, for instance designed as shown in FIGS. 3 and 4. This heat transferring part 13a has three heat transferring surfaces adjacent to: A) the unity tube 3, B) the metal tube 17, which are connected to a distribution system for heat and/or cooling, and C) the heat insulating part 5a.

Each of the first and second areas 3a, 3e of the unity tube 3 are thus in this embodiment surrounded by a heat conducting part 13a, 13e for cooling or heating of a heat carrying medium such as water, or reverse so that the first and second parts of the unity tube shall be cooled or heated of the heat carrying medium, see FIGS. 3 and 4. Such a heat transferring part 13a, 13e, may be designed as a bent metal panel 15, for instance of aluminum or copper, which comprises an outer part 15o for contacting and being adjacent to the outer surface of areas 3a and 3e respectively of the unity tube 3. The bent panel then has at least one longitudinal bending 15b or bending of 180°, which imposes that its inner part 15i and outer part 15o may be segments of concentrically cylinders so that these parts are parallel to each other. At the bent part 15b, longitudinal metal conduits 17 in which the heat carrying medium flows, be positioned and then the metal conduits may be within the bent part to achieve good heat conducting contact between the metal panel 15 and the metal conduits 17. The metal conduits 17 have thus the same longitudinal direction or longitudinal axis as the part 3a or 3b or the unity tube 3 at which they are positioned.

In FIG. 4 there is shown an embodiment of the heat transferring part 13a, 13e designed as a bent panel 15 with two bendings 15b of 180°, extending parallel to each other and which when the panel 15 is positioned around a unity tube 3 are positioned relatively close to each other. In order to hold the two metal tubes 17 in position within the bent parts 15b, hooks 23 may be used which are positioned at a certain distance from each other in the longitudinal direction of the panel 15 and the metal conduits 17 and pass through a hole in the panel. In each bend 15b there is a metal conduit 17 for a heat carrying medium so that two metal tubes are used, which as shown are parallel to each other and with a relatively short distance from each other, for instance within an angular sector of at most 90°, measured from the longitudinal axis at the relevant part of the unity tube, or better within an angular sector of at most 45°, or at most 30°.

The reactor part of the unity tube 3 may be built for instance as shown in the above mentioned international patent application WO 2007/139476. The matrix is then applied as a mat.

Matrix Mat

Figure 2B:
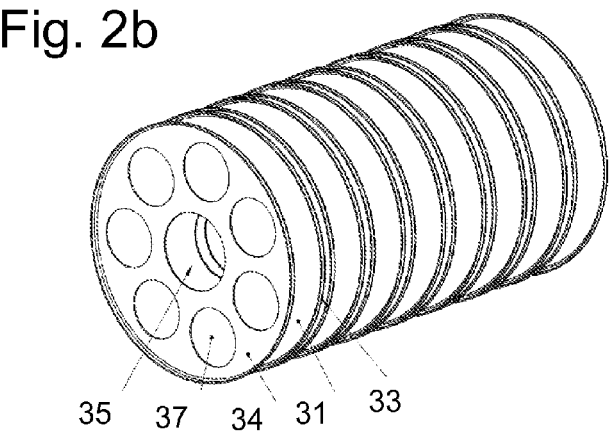
FIG. 2b shows a perspective drawing of a first embodiment of the internal design of the chemical heat pump.
Figure 2C:
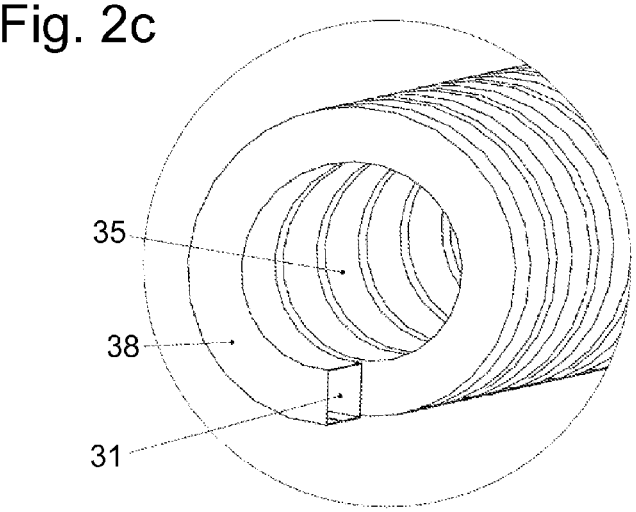
FIG. 2c shows a perspective drawing of a second embodiment of the internal design of the chemical heat pump.
Figure 2D:
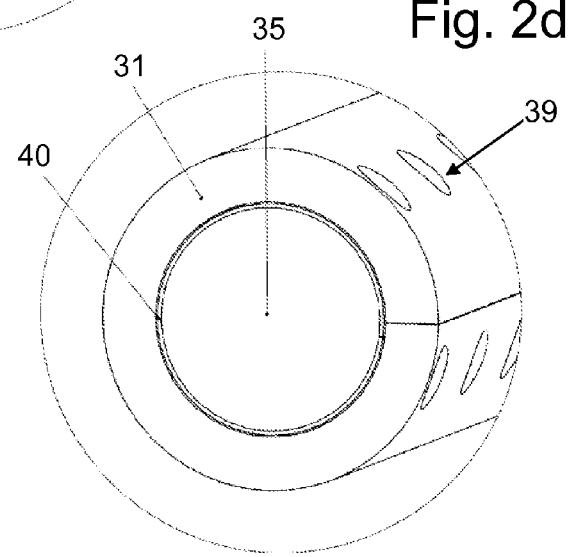
FIG. 2d shows a perspective drawing of a third embodiment of the internal design of the chemical heat pump.

The matrix 31 is held between a heat conducting metal net 39 and the inner wall of the unity tube 3, see FIG. 2d. The metal in the net 39 may for instance be copper or stainless steel. The matrix is thereby positioned as a matrix mat against the inner wall of a conduit 3a, 3e in the unity tube 3 and comprises holes 40 designed for efficient gas transport within the matrix 31. A channel 35 is created along the axis of the tube part, in which channel 35 steam or gas may pass. Also transport of steam or gas to and from the matrix may occur through the holes 40 in the matrix mat and through the metal net 39.

Two other possible embodiments of the reactor part and evaporator/condenser part of the unity tube 3 will now be described, in which the absorbing material, i.e. the matrix material is applied as strips along the inner wall surface of the parts 3a and 3e respectively of the unity tube. Between the axially directed surfaces of the strips there is free space for passage of steam and gas to and from the material and to and from respectively and central through channel 35.

Matrix between Metal Washers

Each of the two areas 3a, 3e of the unity tube 3 are filled with washers of matrix material with a hole in the center 31 put in layers with heat conducting metal washers 33, 34 with a hole in the center, for instance of copper or stainless steel, se FIG. 2b. A first metal washer with a hole in the center 33 is placed down in a at one end sealed tube part 3a, 3e followed by a thereon applied matrix washer with a hole in the center and a thereon applied second metal washer 34 with a hole in the center. The other metal washer 34 comprises more holes 37 in addition to a hole in the center 35, see FIG. 2b. These three washers 33, 31, 34 constitute a unit. Between each such unit a distance tube, not shown, is positioned to separate the units from each other and to allow passage of gas between the units. The center holes 35 in each unit constitute the through channel 35, which extends along the axis of the conduit 3a, 3e and in which steam or gas can pass. Steam or gas may also pass through the further holes 37, which are in the second metal washer 34 in each unit.

Matrix Shaped as a Spiral

The matrix 31 is held between a heat conducting metal net 38 and the inner wall of the unity tube 3, see FIG. 2c. The metal in the net 38 may for instance be copper or stainless steel. The matrix 31 and the metal net 38 extend in the form of a spiral or a helix along the inner wall of a conduit 3a, 3e in the unity tube 3, so that a channel 35 is created along the axis of the conduit, in which channel 35 steam or gas may pass. The pitch of the spiral or helix is adapted so that a space is created for each turn, whereby passage of steam or gas can occur through the spiral or helix. Steam or gas may also be transported to and from the matrix 31 through the metal net 38.

The methods for charging and discharging of the chemical heat pump component are the same as for previously described heat pumps according to the hybrid principle with a matrix construction.

An example of use of the solar panel is described:

Solar Driven System for Delivery of Heat and Cooling to a Building

Figure 6:
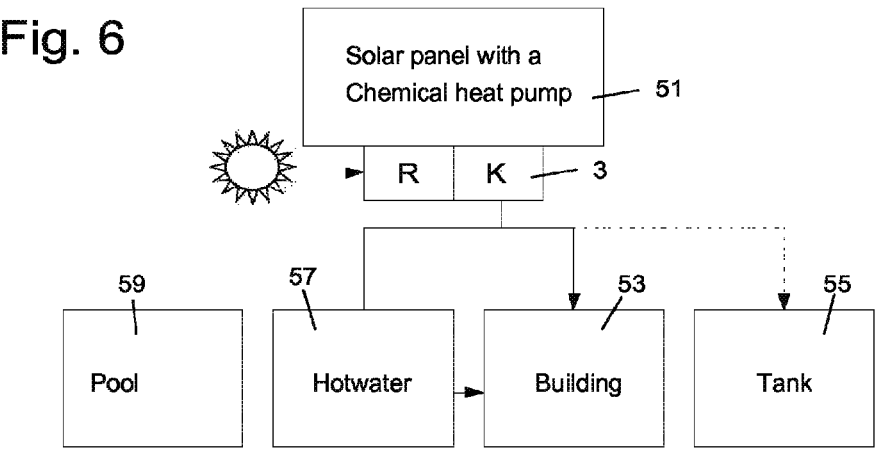
FIG. 6 shows a schematic diagram of a solar panel module for heating and cooling of a building.

The system comprises the present thermal solar panel 51 comprising a chemical heat pump 3 as described above, the regular heating/cooling system 53 of the building, a heat sink and an ice storage in a tank 55, see FIG. 6. Further the system may comprise a system 57 for distribution of hot tap water and a swimming pool 59.

In addition to everything a traditional solar panel is capable to, the present thermal solar panel comprising a chemical heat pump is able to deliver heat all night and day and in addition deliver cooling, see FIG. 7a-7d.

Figure 7A:
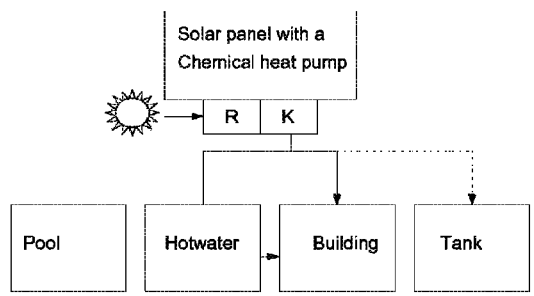
FIGS. 7a and 7b show schematic diagrams similar to FIG. 6 showing the function of the solar panel system during the day and the night respectively in the Winter.
Figure 7C:
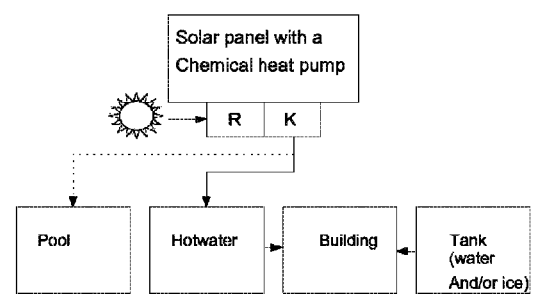
FIGS. 7c and 7d show schematic diagrams similar to FIG. 6 showing the function of the solar panel system during the day and the night respectively in the Summer.
Figure 7B:
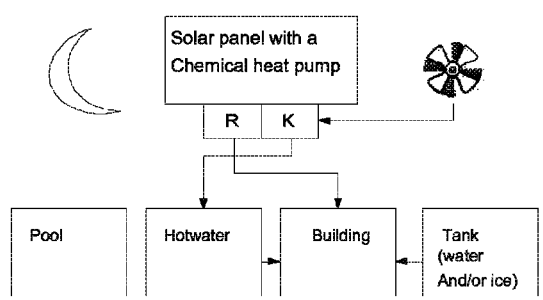

In FIGS. 7a and 7b there is shown the function of the system a typical winter day when the system delivers heat to the building during the day and during the night respectively. During the day the solar panel 51 receives energy from sunlight and thereby the chemical heat pump 3 is charged when its reactor part is heated more that its evaporator/condenser part. During the charging heat is formed in the evaporator/condenser part and this heat is transferred by its heat exchanger and the heat carrying medium to the heating system of the building 53 and optionally also to its system 57 for hot tap water. When the solar radiation has ceased the chemical heat pump 3 is discharged and then the reactor part is heated. Heat from the reactor part is transported by its heat exchanger and the heat carrying medium to the heating system of the building.

Figure 7D:
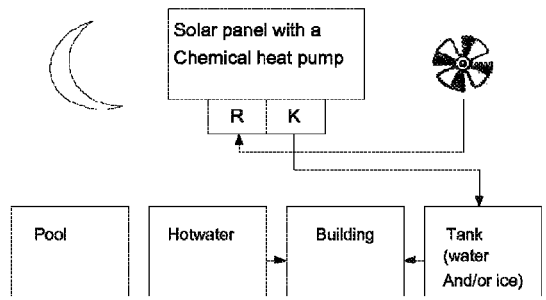

In FIGS. 7c and 7d show the function a typical Summer day, when the systems delivers cooling to the building during the day and night respectively. During the day the solar panel 51 receives energy from sunlight and thereby the chemical heat pump 3 is charged since its reactor part is heated more than its evaporator/condenser part. During the charge heat is formed in the evaporator/condenser part and this heat may be transferred by its heat exchanger and the heat carrying medium to the system 57 for hot tap water in the building. When the solar radiation has ceased the chemical heat pump is discharged and thereby the reactor part is heated, whereas the evaporator/condenser part becomes colder. Cooled heat carrying medium from the evaporator/condenser part is lead to the cooling system 53 of the building.

Advantages of the herein described thermal solar panel comprising a chemical heat pump compared to a separate solar panel and a separate chemical heat pump include but is not limited to one or several of the following:

No heat pump is needed indoors.

The system is able to distribute heat and cooling through air instead of liquid. This leads to lower costs for the system and fewer interruptions.

The entire capacity of the chemical heat pump is utilized, when it in the middle of the day is necessary to receive the peak effect from the sun, i.e. when storage of energy is needed at most. When cooling is produced during the night it is produced when it is easiest during the coldest time of the night and with the entire capacity of the chemical heat pump, which gives a better COP for cooling and during charging and discharging a smaller device can be utilized.

A combined solar panel and chemical heat pump reduces the consumption of expensive materials.

Heat losses are reduced to a minimum when the solar energy does not have to be transported in a system of conduits.

With smaller heat losses the system can be run with a higher temperature of the heat sink, which means: i) expensive parts of the system of conduits can be removed since it is not necessary to pump the hot solar panel water. ii) The heat sink can be integrated in the solar panel, whereby the need for installation of cooling towers and drilled holes is reduced. iii) Low cost for the required electrical energy due to reduced need for pumps. iv) The extremely small losses make it possible to run the system at a higher temperature. v) Quality cooling with production of ice during the summer. vi) Quality heat when the condenser produces usable hot tap water. Instead of as today use pre-heating of the hot tap water, the hot tap water can be directly heated, which simplifies the system. vii) Quality heat during the winter when heat for the first time can be produced during all hours even if the outdoor temperature is below 0° C. No other accumulation of heat is necessary.

The system can be freely dimensioned according to the need of the end user, from one solar panel to thousands of solar panels for an apartment, a detached house, a hotel, an office, an industry. The system is completely modular and only one type of end product has to be manufactured.

While specific embodiments of the invention have been shown and described, it must be realized that a plurality of other embodiments are encompassed and that further advantages, modifications and changes are obvious for a skilled person without departing from the idea and scope of the invention. Thus the invention it its wider aspects is not limited to the specific details, representative devices and examples shown and described here. In accordance therewith various modifications may be made without departing from the idea or the scope of the general inventive concept defined by the appended claims and equivalents thereof. It must be realized that the appended claims are meant to encompass all such modifications and changes falling within the true idea and concept of the invention.

The invention claimed is:

1. A solar panel comprising a first conduit adapted to comprise a heat carrying medium for heat transfer between the solar panel and a surrounding environment, whereby the solar panel comprises a chemical heat pump comprising an active substance and a volatile liquid, which can be absorbed by the substance at a first temperature and be desorbed by the substance at a second higher temperature, and the chemical heat pump comprises:

a first part having a longitudinal direction and comprising a reactor part, which comprises the active substance and is adapted to be heated and be cooled by an external medium, whereby the first part is positioned to be heated by sunlight, when radiation from the sun shines at the solar panel for charging of the chemical heat pump, an evaporator/condenser part comprising volatile liquid in condensed form and being adapted to be heated and cooled by an external medium, and a passage for the gas phase of the volatile liquid, connecting the reactor part and the evaporator/condenser part with each other, the chemical heat pump is designed as a hermitically sealed unit tube and the first conduit extends over the first part in the longitudinal direction of the first part in heat conducting contact with the unit tube in the first part, and a second part of the unit tube comprises the evaporator/condenser part of the chemical heat pump, the second part of the unit tube being placed in direct proximity to the first part, in particular so that it is placed behind the first part as seen in the direction of the rays from the sun.

2. The solar panel according to claim 1, wherein a radiation receiving part is designed with a surface for transformation of solar radiation to heat and which is in heat conducting contact with the first part, in particular also with the first conduit.

3. The solar panel according to claim 1, wherein the unit tube is surrounded by a heat insulating part, in particular by a heat insulating part of the vacuum jug type comprising an evacuated space.

4. The solar panel according to claim 3, wherein the heat insulating part is of the vacuum jug type comprising an evacuated space positioned between an outer and an inner wall, whereby the inner wall at the first part at its outwards directed surface comprises a radiation receiving part, which is or has a surface adapted for transformation of solar radiation to heat and which is in heat conducting contact with the first part, in particular also with the first conduit.

5. The solar panel according claim to 1, wherein there is a second part of the unit tube, which comprises the evaporator/condenser part of the chemical heat pump and is designed and/or positioned so that when radiation from the sun shines at the solar panel, the second part is heated less than the first part, in particular so that the second part is heated considerably less than the first part.

6. The solar panel according to claim 1, wherein a first heat transferring part is positioned in direct heat conducting contact with the first part and with the first conduit.

7. The solar panel according to claim 6, wherein the first heat transferring part comprises an inner part in contact with the first part and having the shape of a sheet or a bent panel, surrounding a part of or essentially the entire first part.

8. The solar panel according to claim 7, wherein the first heat transferring part comprises an outer part surrounding essentially the entire inner part.

9. The solar panel according to claim 8, wherein the inner and outer parts of the first heat transferring part are connected by an intermediate part positioned directly against the surface of the first conduit.

10. The solar panel according to claim 6, wherein
the first part of the unit tube is surrounded by a heat insulating part of the type vacuum jug, comprising an evacuated space situated between an outer wall and an inner wall, and
the first heat transferring part is positioned against the inner wall of the heat insulating part, against the first part, and against the first conduit.

11. The solar panel according to claim 10, wherein the first heat transferring part comprises an inner part and an outer part, whereby the outer part essentially surrounds the entire inner part and is positioned against the inner wall of the heat insulating part.

12. The solar panel according to claim 1, wherein there is a second heat transferring part, positioned in direct heat conducting contact with a second part of the unit tube, comprising the evaporator/condenser part of the chemical heat pump and with a second conduit designed to comprise a heat carrying medium for heat exchange between the solar panel and a surrounding environment, in particular so that the second conduit is adapted for connection to a distribution system for the heat carrying medium.

13. The solar panel according to claim 12, wherein the second heat transferring part comprises an inner part positioned against the second part, whereby the inner part in particular has the shape of a sheet or a bent panel, surrounding a part of or essentially the entire second part.

14. The solar panel according to claim 13, wherein the second heat transferring part comprises an outer part surrounding essentially the entire inner part.

15. The solar panel according to claim 14, wherein the inner and outer parts of the heat transferring part are connected by an intermediate part positioned directly against the surface of the second conduit.

16. The solar panel according to claim 1, wherein there is a reflector positioned to reflect sunlight for heating of the first part.

17. The solar panel according to claim 16, wherein the reflector is a part of a reflector panel comprising first parts for reflection of sunlight for a plurality of adjacent positioned first unit tubes and associated first conduits.

18. The solar panel according to claim 17, wherein the reflector panel comprises second parts, positioned between the first parts and positioned for uptake of a second part of second unit tubes, comprising the evaporator/condenser part of the chemical heat pump and which are positioned between the first unit tubes and associated first conduits.

\* \* \* \* \*